United States Patent [19]

Schwarz

[11] 4,438,230

[45] Mar. 20, 1984

[54] CARBOXYLATED NITRILE RUBBER/PVC/NYLON FLUX BLENDS

[75] Inventor: Herbert F. Schwarz, Sarnia, Canada

[73] Assignee: Polysar Limited, Ontario, Canada

[21] Appl. No.: 444,975

[22] Filed: Nov. 29, 1982

[51] Int. Cl.³ .................. C08K 5/37; C08L 27/06; C08L 33/18; C08L 77/00

[52] U.S. Cl. .................................. 524/151; 524/289; 525/178; 525/179; 525/183; 525/184

[58] Field of Search ............... 525/178, 179, 183, 184; 524/151, 289

[56] References Cited

U.S. PATENT DOCUMENTS

| | | | |
|---|---|---|---|
| 3,264,371 | 8/1966 | Gruber et al. | 525/178 |
| 4,383,083 | 5/1983 | Nielinger | 525/183 |

FOREIGN PATENT DOCUMENTS

| | | | |
|---|---|---|---|
| 45-30342 | 10/1970 | Japan | 525/184 |
| 53-21252 | 2/1978 | Japan | 525/183 |
| 57-57720 | 4/1982 | Japan | 525/184 |

*Primary Examiner*—Paul Lieberman
*Assistant Examiner*—A. L. Carrillo
*Attorney, Agent, or Firm*—Stevens, Davis, Miller & Mosher

[57] ABSTRACT

Vulcanizable polymer compositions, comprising a polymer blend and a curative system, and a process for preparing the compositions are provided. The polymer blend comprises a flux blend of a PVC, a carboxylated nitrile rubber and a nylon having a melting point of less than about 210° C., and stabilizers. Vulcanizates of the polymer compositions have improved properties and may be used, for example, in spinning cots.

21 Claims, No Drawings

CARBOXYLATED NITRILE RUBBER/PVC/NYLON FLUX BLENDS

FIELD OF THE INVENTION

This invention relates to vulcanizable flux blends of carboxylated nitrile rubber, polyvinyl chloride and nylon.

DESCRIPTION OF THE PRIOR ART

Blends of polyvinyl chloride and nitrile rubber (copolymers of butadiene and acrylonitrile) are known and have been used in a variety of applications. Such blends are often mixed with conventional sulfur or peroxide curative systems and cured to produce vulcanizates which exhibit good storage and colour stability, good ozone and weather resistance, good oil resistance, heat resistance and abrasion resistance. Such vulcanizates may be used in applications such as wire and cable jackets, shoe soles, hose covers, printing roll covers and spinning cots. Carboxylated nitrile rubber (copolymers of butadiene, acrylonitrile and one or more $\alpha,\beta$-unsaturated carboxylic acids) may be used to replace part or all of the nitrile rubber in these blends to provide vulcanizates for use in applications where high tensile strength is required, for example in spinning cots.

Blends of polyvinyl chloride with nitrile rubber and/or carboxylated nitrile rubber are generally prepared by dry mixing of the polymers together with compounding ingredients as desired at elevated temperatures for a long enough time and at a high enough temperature to ensure melting or fluxing of the polyvinyl chloride and intimate mixing of the ingredients. Blends prepared in this manner are referred to in the art as flux blends and are generally preferred to blends of these polymers prepared by mixing in latex form. The flux blends may subsequently be mixed with conventional sulfur or peroxide curative systems and other compounding ingredients, molded to the desired shape of the finished article and heated to cure them.

In certain applications, it is desirable to use vulcanizates of flux blends which have an improved combination of ozone resistance, retention of elongation at break upon aging, and high aged and unaged tensile strength compared to those vulcanizates known in the art.

SUMMARY OF THE INVENTION

Accordingly, the present invention provides a vulcanizable polymer composition comprising a polymer blend and a curative system, said polymer blend being a flux blend of (i) from about 5 to about 50 parts by weight of polyvinyl chloride, (ii) from about 35 to about 75 parts by weight of a carboxylated nitrile rubber, (iii) from about 5 to about 50 parts by weight of a nylon having a melting point of less than about 210° C., the total of (i), (ii) and (iii) being 100 parts by weight, (iv) from about 1.5 to about 4 parts by total weight of one or more stabilizers for (i), and (v) from about 0.25 to about 3 parts by total weight of one or more antioxidants for (ii), said parts of (iv) and (v) being per 100 parts total of (i), (ii) and (iii).

The present invention also provides a vulcanizate obtained by heating said polymer composition.

The present invention further provides a process for preparing a vulcanizable polymer composition comprising admixing (i) from about 5 to about 50 parts by weight of polyvinyl chloride, (ii) from about 35 to about 75 parts by weight of a carboxylated nitrile rubber, (iii) from about 5 to about 50 parts by weight of a nylon having a melting point of less than about 210° C., the total of (i), (ii) and (iii) being 100 parts by weight, (iv) from about 1.5 to about 4 parts by total weight of one or more stabilizers for (i), and (v) from about 0.25 to about 3 parts by total weight of one or more antioxidants for (ii), said parts of (iv) and (v) being per 100 parts total of (i), (ii) and (iii), said admixing being at a temperature sufficient to cause fluxing of (i) and (iii) and mixing of all the components and for a length of time sufficient to cause such mixing but not to cause significant thermal degradation of the components, recovering and cooling the polymer blend so formed, and admixing said polymer blend with a curative system to form said polymer composition.

The present invention still further provides a process comprising heating said polymer composition to provide a vulcanizate.

Vulcanizates of the present invention generally have higher tensile strength, both aged and unaged, and greater retention of elongation at break upon aging compared to vulcanizates prepared from known flux blends of polyvinyl chloride and carboxylated nitrile rubber. The presence of the polyvinyl chloride component in the flux blends also provides superior ozone resistance to the vulcanizates of the present invention compared to vulcanizates prepared from flux blends of carboxylated nitrile rubber and nylon.

DETAILED DESCRIPTION

The polyvinyl chloride used in the present invention may be any polyvinyl chloride resin known in the art. However, most applications require that the polymer composition be formed into various shapes at some stage prior to vulcanization. For this reason, it is preferred to use a low molecular weight polyvinyl chloride resin which provides easy processing. Many such resins are commercially available. Polyvinyl chloride sold under the trade name Esso PVC 360 by Esso Chemical Canada has been found to provide satisfactory results when used in the present invention. The amount of polyvinyl chloride in a polymer blend for use in the present invention is from about 5 to about 50 parts by weight per 100 parts by weight of the total polymer in the polymer blend, the weight of total polymer being the sum of the weights of polyvinyl chloride, carboxylated nitrile rubber, and nylon.

The carboxylated nitrile rubber used in the present invention may be any of those known in the art. These are copolymers of butadiene, acrylonitrile and one or more $\alpha,\beta$-unsaturated carboxylic acids. The carboxylic acids may contain one or more carboxylic groups. Because of cost and availability, it is preferred that the carboxylic acids be selected from acrylic, methacrylic, fumaric, maleic and itaconic acids. The copolymers may be prepared by the well known emulsion free radical process. The acrylonitrile content of the copolymer may be from about 20 to about 40 percent by weight of the copolymer. The total content of carboxylic acid in the copolymer may be from about 0.5 to about 10 percent by weight of the copolymer. Butadiene forms the balance to 100 percent by weight of the copolymer. The molecular weight of the copolymer is generally within the Mooney range (ML 1+4 at 100° C.) of from about 40 to about 80. The amount of carboxylated nitrile rubber in a polymer blend for use in the present invention is from about 35 to about 75 parts by weight per 100 parts by weight of the total polymer in the polymer blend.

The nylon used in the present invention may be any nylon which has a melting point of less than about 210° C. and preferably less than about 195° C. Nylons are also referred to as polyamides and are condensation products containing recurring amide groups. Nylons may be homopolymers of amino acids or copolymers of one or more diamines with one or more dicarboxylic acids as is well known in the art. Using the standard numerical system for identifying types of nylon, suitable nylons for use in the present invention include nylon-11, nylon-12, and nylon-6,9 which have melting points of about 194°, 179°, and 205° C. respectively and also multi-component nylons known in the art with melting points of less than about 210° C. such as nylon-6,6/6,10/6 (40/30/30) which has a melting point of about 160° C. The lower melting point nylons are preferred because it is desirable to use the lowest temperature possible when fluxing in order to minimize any significant thermal degradation of the components of the polymer blend which may occur due to the elevated temperature. Due to cost and availability, it is preferred to use nylon-11 or nylon-12. The amount of nylon in a polymer blend for use in the present invention is from about 5 to about 50 parts by weight per 100 parts by weight of the total polymer in the polymer blend.

The stabilizers for polyvinyl chloride used in the present invention may be one or more of any of the commercially available metal salts, organometallic salts or soaps, or organometallic compounds which are well known in the art of polyvinyl chloride stabilizers. Because of the proprietary nature of these stabilizers, their exact chemical composition is frequently not disclosed. A description of available stabilizers and a scheme for their classification is given in Chapter 9 of "Encyclopedia of PVC" edited by Leonard I. Nass and published by Marcel Dekker Inc. Using the classification scheme described therein, suitable stabilizers for use in the present invention include lead salts, mixed metal salts, organotin stabilizers, and special-purpose antimony mercaptides and organonickel stabilizers. Preferred stabilizers include the mixed metal salts of barium/cadmium, barium/cadmium/zinc, and barium/zinc and the organotin stabilizers. The total amount of stabilizers in a polymer blend for use in the present invention is from about 1.5 to about 4 parts and preferably from about 2 to about 3 parts by weight per 100 parts by weight of the total polymer in the polymer blend.

The antioxidants for the carboxylated nitrile rubber used in the present invention may be one or more of any of the antioxidants used in the art in compounding heat resistant nitrile rubber or carboxylated nitrile rubber. Suitable antioxidants include p-cumyldiphenylamine, octylated diphenylamine, polymerized 1,2-dihydro-2,2,4-trimethylquinoline, nickel salts of dibutyl- and dimethyl-dithiocarbamate, 2-mercaptobenzimadazole and mercaptotolylbenzimidazole and their zinc salts, tris(nonylated phenyl) phosphite, p-phenylenediamine derivatives such as the di-beta-naphthyl, N-isopropyl-N'-phenyl, and N-phenyl-N'-cyclohexyl derivatives, and hindered phenolic antioxidants such as thiodiethylene bis(3,5-di-t-butyl-4-hydroxy)hydrocinnamate and mixtures thereof. The total amount of antioxidants in a polymer blend for use in the present invention is from about 0.25 to about 3 parts by weight per 100 parts by weight of the total polymer in the polymer blend. It is preferred to use a mixture of antioxidants comprising from about 0.4 to about 1 part by weight of tri(nonylated phenyl) phosphite and from about 0.5 to about 1 part by weight of thiodiethylene bis(3,5-di-t-butyl-4-hydroxy)hydrocinnamate.

To prepare the polymer blends for use in the present invention, the polyvinyl chloride, carboxylated nitrile rubber, nylon, stabilizers and antioxidants are admixed and fluxed to prepare a flux blend masterbatch. Small amounts of a crosslinking agent for the polyvinyl chloride such as 6-dibutylamino-1,3,5-triazine-2,4-dithiol and plasticizers such as dioctyl phthalate, dioctyl sebacate and epoxidized soya bean oil may also be included in the formulation used to prepare the flux blend masterbatch. Suitable amounts of the crosslinking agent are from about 0.2 to about 0.5 part by weight and suitable amounts of plasticizer are from about 2 to about 5 parts by weight, both being per 100 parts by weight of total polymer in the polymer blend.

To prepare the flux blend masterbatch, all of the ingredients are loaded in a suitable internal mixer, such as a Banbury mixer, and mixed with the steam on for a total of 5-6 minutes. The chamber temperature reached must be sufficient to cause fluxing of the nylon but should not exceed about 210° C. Such conditions are sufficient to cause mixing of all of the components of the polymer blend but not to cause significant thermal degradation of the components. The masterbatch is then recovered and cooled, for example by sheeting the composition off on a rubber mill.

The flux blend masterbatch is mixed with a curative system and other compounding ingredients as desired to form a vulcanizable polymer composition. The curative system may comprise an organic peroxide alone or in combination with one or more sulfur-containing accelerators or the curative system may comprise elemental sulfur in combination with one or more sulfur-containing accelerators and optionally with an inorganic peroxide. Suitable organic peroxides include dicumyl, benzoyl and lauryl peroxide. Suitable sulfur-containing accelerators include the benzothiazyl, thiuram and guanidine type accelerators. A suitable inorganic peroxide is zinc peroxide which is preferably used as a masterbatch of about equal parts by weight of zinc peroxide and a butadiene-acrylonitrile rubber. A preferred curative system comprises elemental sulfur, a zinc peroxide/butadiene-acrylonitrile rubber masterbatch and the accelerators dibenzothiazyl disulfide, diphenylguanidine and tetramethylthiuram mono- or disulfide. Other compounding ingredients may include activators such as zinc oxide and stearic acid, antioxidants, antiozonants, fillers and plasticizers. Mixing may be carred out on a mill or in a Banbury mixer using a mixing temperature of from about 90° to about 140° C. and preferably from about 105° to about 120° C. The amounts of compounding ingredients and components of the curative system are in accordance with those used in the prior art in flux blend masterbatches of polyvinyl chloride and nitrile or carboxylated nitrile rubber. The polymer composition may be shaped by extrusion into a variety of profiles, tubes and sheets prior to curing. The polymer composition is heated to form a vulcanizate and this is normally carried out in a press at elevated temperatures. Vulcanizates of the present invention are especially useful in spinning cots where high tensile strength, aged retention of elongation at break and ozone resistance are desired.

In a first preferred embodiment of the present invention, the carboxylated nitrile rubber component (ii) of the polymer blend has an acrylonitrile content of from about 25 to about 35 percent by weight and a carboxylic acid content of from about 4 to about 8 percent by weight of the copolymer. The amount of component (i) in the polymer blend is from about 5 to about 50 and more preferably from about 5 to about 35 parts by weight and the amount of component (iii) is from about 5 to about 50 and more preferably from about 15 to about 35 parts by weight, the balance to 100 parts by weight being component (ii).

In a second preferred embodiment of the present invention, component (ii) of the polymer blend has an acrylonitrile content of from about 25 to about 35 percent by weight and a carboxylic acid content of from about 0.5 to about 2 percent by weight of the copolymer. The amount of (i) in the polymer blend is from about 20 to about 35 parts by weight, the amount of (ii) is from about 35 to about 50 parts by weight, and the amount of (iii) is from about 20 to about 35 parts by weight.

The present invention is illustrated by the following examples which are not intended to be limiting.

EXAMPLE 1

In this and the following examples, the polymers used are identified in Table 1. The figures given are percent by weight.

TABLE 1

| Polymer | Composition |
|---|---|
| XNBR-I | A carboxylated nitrile rubber containing about 29 percent acrylonitrile and about 7 percent carboxylic acid. |
| XNBR-II | A carboxylated nitrile rubber containing about 33 percent acrylonitrile and from about 0.5 to about 1 percent carboxylic acid. |
| PVC | A polyvinyl chloride sold under trade name Esso PVC 360 by Esso Chemical Canada. |
| Nylon-I | A nylon-11 sold under tradename BESNO TL by Rilsan Canada. |
| Nylon-II | A powdered nylon-11 sold under trade name RDP 15-10 by Rislan Canada. |
| NBR | A nitrile rubber containing 34 percent acrylonitrile. |

Six flux blend masterbatches were prepared using the same procedure. Mixing was carried out in a laboratory in Banbury mixer at 77 rpm. The ingredients shown in Table 2 were loaded at zero minutes with the Banbury at of 80° C. and the steam on. Mixing was initiated and continued for a total time of 5-6 minutes. At the time when the chamber temperature reached about 165° C., the ram was lifted and the Banbury brushed down. The maximum temperature reached was that shown in the table. After mixing, the compositions were dumped and sheeted off using a laboratory mill with roll temperature of about 80° C. to provide the masterbatches. The Mooney viscosity was measured according to ASTM-D1646-81.

Masterbatches 1 and 2 are comparative blends while 3 through 6 are polymer blends for use in the present invention.

Each of the flux blend masterbatches was then compounded as shown in Table 3. The ingredients were mixed in a laboratory Banbury mixer at 77 rpm. Those ingredients shown as Part A were loaded at zero minutes with the temperature at 70° C. At 1 minute Part B and half of Part C were added and at 2.5 minutes the rest of Part C and all of Part D were added. At 4 minutes, the ram was lifted and the Banbury brushed down. Mixing was continued to 5 minutes with the maximum temperature being 110°-115° C. The compounds were then dumped and placed on a laboratory mill with roll temperatures of about 80° C. The compounds were thoroughly mixed with Part E of the ingredients on the mill and sheeted off. The physical properties of the resulting polymer compositions shown in Table 4 were determined according to ASTM-D1646-81 (viscosity and scorch) and ASTM-D2230-78 (extrusion).

The polymer compositions were then press cured for 7 minutes at 166° C. and the physical properties of the resulting vulcanizates were then determined according to ASTM-D2240-81 (hardness), ASTM-D412-80 (modulus, tensile strength and elongation), ASTM-D624-81 (tear strength), ASTM-D395-78 (compression set), ASTM-D573-81 (hot air aging), and ASTM-D471-79 (oil and fuel resistance). Data are given in Table 4.

It can clearly be seen from the data that vulcanizates of the present invention prepared from masterbatches 3 through 6 have superior tensile strength, both aged and unaged, compared to comparative vulcanizates prepared from masterbatches 1 and 2. Although the vulcanizates of the present invention have a relatively low unaged elongation at break, they retain a high proportion of this elongation upon aging.

TABLE 2

| Masterbatch Identification | 1 | 2 | 3 | 4 | 5 | 6 |
|---|---|---|---|---|---|---|
| Ingredients (parts by weight): | | | | | | |
| XNBR - I | — | 50 | 40 | — | 40 | — |
| XNBR - II | — | — | — | 40 | — | 40 |
| NBR | 50 | — | — | — | — | — |
| PVC | 50 | 50 | 30 | 30 | 30 | 30 |
| Nylon - I | — | — | 30 | 30 | 30 | 30 |
| Tri(nonylated phenyl) phosphite | — | 1.0 | 0.6 | 0.6 | 0.6 | 0.6 |
| Thiodiethylene bis(3,5-di-t-butyl-4-hydroxy)hydrocinnamate | — | 0.5 | 0.25 | 0.25 | 0.25 | 0.25 |
| Barium/cadmium stabilizer | 2.25 | 2.5 | 2.5 | 2.5 | 2.5 | 2.5 |
| Plasticizer (sold under trade name STRUKTOL 60 NS by Struktol Co. Ltd.) | — | — | 3.5 | 3.5 | 3.5 | 3.5 |
| 6-dibutylamino-1,3,5-triazine-2,4-dithiol | — | — | — | — | 0.3 | 0.3 |
| Stearic Acid | — | 2.0 | — | — | — | — |
| N,N—ethylene bis(stearamide) | — | 2.0 | — | — | — | — |
| Processing aid (sold under trade name TE 80 by Technical Processing Inc.) | — | 2.0 | — | — | — | — |
| Dioctylphthalate | 2.5 | 1.0 | — | — | — | — |
| Epoxidized soybean oil | 2.5 | — | — | — | — | — |
| Phosphite chelator (sold under trade name Nuostabe V 142 by Tenneco Chemicals) | 0.5 | — | — | — | — | — |
| Maximum Mixing Temperature (°C.): | 165 | 165 | 166 | 180 | 174 | 188 |

TABLE 2-continued

| Masterbatch Identification | 1 | 2 | 3 | 4 | 5 | 6 |
|---|---|---|---|---|---|---|
| Mooney Viscosity (MS 1 + 4 at 100° C.): | 65 | 75 | 31.5 | 36 | 37.5 | 49.5 |

TABLE 3

| Masterbatch Identification:<br>Ingredients (parts by weight): | 1 | 2 through 6 |
|---|---|---|
| Part A: | | |
| Masterbatch | 100 | 100 |
| Part B: | | |
| Zinc oxide | 3.0 | — |
| Stearic acid | 1.0 | 1.0 |
| Hindered bisphenol antioxidant (sold under tradename NAUGAWHITE by Uniroyal) | 2.0 | 2.0 |
| Antiozonant (sold under tradename SUNPROOF IMPROVED WAX by Uniroyal) | 3.0 | 3.0 |
| Sulfur | 1.25 | 1.25 |
| Titanium dioxide | 1.5 | 1.5 |
| Part C: | | |
| Hydrated aluminum silicate | 100 | 100 |
| Part D: | | |
| Dioctyl phthalate | 30 | 30 |
| Part E: | | |
| 2,2''-dibenzothiazyl disulfide | 2.0 | 2.0 |
| Tetramethylthiuram monosulfide | 0.5 | 0.5 |
| Diphenylguanidine | 0.5 | 0.5 |
| Masterbatch of 50 parts by weight of zinc peroxide in 50 parts by weight of nitrile rubber (sold under the tradename KRYNAC PA-50 by Polysar Ltd.) | — | 6.0 |

TABLE 4

| Masterbatch Identification: | 1 | 2 | 3 | 4 | 5 | 6 |
|---|---|---|---|---|---|---|
| Physical Properties Before Curing: | | | | | | |
| Mooney viscosity (ML 1 + 4 at 100° C.) | 34.5 | 52 | 49 | 39.5 | 56.5 | 41.5 |
| Mooney scorch (T5 at 125° C.) (min.) | 20.25 | 24.75 | 17.25 | 23.5 | 12.25 | 20.5 |
| Extrusion #½ROYLE, Garvey die at 104° C., 70 rpm: | | | | | | |
| Extrusion rate (cm/min) | 141 | 160 | 101 | 90 | 141 | 164 |
| Die swell (%) | 23 | 33.5 | −3.1 | −2.7 | −4.8 | −3.5 |
| Appearance rating | A10 | A5 | B9 | G1 | E1 | G1 |
| Physical Properties After Curing: | | | | | | |
| Hardness (Shore A) | 74 | 80 | 88 | 87 | 88 | 87 |
| 100% modulus (MPa) | 6.0 | 11.2 | — | — | — | — |
| Tensile strength (MPa) | 11.7 | 14.3 | 20.9 | 18.4 | 24 | 16.6 |
| Elongation at break (%) | 400 | 200 | 50 | 50 | 50 | 50 |
| Tear strength, Die C (kN/m) | 43.1 | 40.1 | 24.5 | 23.5 | 24.5 | 20.6 |
| Compression set (% after 22 hr at 70° C.) | 55.6 | 56.9 | 50.3 | 46.1 | 54.0 | 47.0 |
| Aged in hot air (after 168 hr at 100° C.): | | | | | | |
| Hardness (Shore A) | 81 | 88 | 85 | 88 | 92 | 88 |
| Tensile strength (MPa) | 12.5 | 20 | 27 | 22 | 30.9 | 22.5 |
| Elongation at break (%) | 200 | 80 | 30 | 50 | 30 | 40 |
| Aged in #2 Oil (after 70 hr at 70° C.): | | | | | | |
| Hardness (Shore A) | 77 | 85 | 89 | 87 | 89 | 89 |
| Tensile strength (MPa) | 11.4 | 16.0 | 25.5 | 22.0 | 25.5 | 20.20 |
| Elongation at break (%) | 380 | 160 | 50 | 50 | 50 | 50 |
| Aged in Fuel C (after 48 hr at 23° C.): | | | | | | |
| Hardness (Shore A) | 58 | 67 | 77 | 79 | 82 | 80 |
| Tensile strength (MPa) | 6.4 | 8.5 | 14.4 | 13.0 | 15.5 | 12.0 |
| Elongation at break (%) | 400 | 170 | 40 | 50 | 40 | 40 |

C. for 6 minutes. Physical properties were determined as in Example 1 and the data are given in Table 7.

TABLE 5

| Masterbatch Identification:<br>Ingredients (parts by weight): | 1 | 2 | 3 | 4 | 5 |
|---|---|---|---|---|---|
| XNBR - I | 70 | 70 | 30 | 70 | 70 |
| PVC | 25 | 5 | 65 | — | — |
| Nylon - I | 5 | 25 | 5 | 30 | — |
| Nylon - II | — | — | — | — | 30 |
| Tris(nonylated phenyl) phosphite | 0.6 | 0.6 | 0.6 | 0.6 | 0.7 |
| Thiodiethylene bis(3,5-di-t-butyl-4-hydroxy)hydrocinnamate | 0.25 | 0.25 | 0.25 | 0.25 | 0.25 |
| Barium/cadmium stabilizer | 2.5 | 2.5 | 2.5 | 2.5 | 2.5 |
| Plasticizer (STRUKTOL 60 NS) | 3.5 | 3.5 | 3.5 | 3.5 | 3.5 |
| Mooney Viscosity (ML 1 + 4 at 100° C.) | 76 | 86 | * | 107 | 90 |

*Means not measured.

TABLE 6

| Ingredients | Parts by Weight |
|---|---|
| Part A: | |
| Masterbatch | 100 |
| Part B: | |
| Stearic acid | 1.0 |
| Antioxidant (NAUGAWHITE) | 2.0 |
| Paraffin wax | 3.0 |
| Sulfur | 1.25 |
| Titanium dioxide | 1.5 |
| Part C: | |
| Hydrated aluminum silicate | 100 |
| Part D: | |
| Dioctyl phthalate | 30 |
| Part E: | |
| 2,2'-dibenzothiazyl disulfide | 2.0 |
| Tetramethylthiuram disulfide | 0.5 |
| Diphenylguanidine | 0.5 |
| Masterbatch of zinc peroxide and | 6.0 |

EXAMPLE 2

Five flux blend masterbatches were prepared according to the procedure of Example 1 and using the ingredients shown in Table 5. Masterbatches 1, 2 and 3 are polymer blends for use in the present invention while masterbatches 4 and 5 are comparative.

Each of the masterbatches was compounded indentically as shown in Table 6 according to the procedure of Example 1. The compositions were press cured at 165°

TABLE 6-continued

| Ingredients | Parts by Weight |
|---|---|
| nitrile rubber (KRYNAC PA-50) | |

TABLE 7

| Masterbatch Identification: | 1 | 2 | 3 | 4 | 5 |
|---|---|---|---|---|---|
| Physical Properties Before Curing: | | | | | |
| Mooney viscosity (ML 1 + 4 at 100° C.) | 60 | 66 | 78 | 65 | 64 |
| Mooney scorch (T₅ at 125° C.) (min) | 5.5 | 16 | 9.75 | 17.25 | 15 |
| Physical Properties After Curing: | | | | | |
| Hardness (Shore A) | 77 | 82 | 92 | 84 | 82 |
| 100% modulus (MPa) | 8.4 | — | — | — | 16.5 |
| Tensile Strength (MPa) | 14.1 | 19.3 | 18.6 | 13.7 | 16.9 |
| Elongation at break (%) | 320 | 90 | 100 | 90 | 110 |
| Tear strength, Die C (kN/m) | 39.2 | 25.5 | 49 | 29.4 | 30.4 |
| Compression set (% after 22 hr at 70° C.) | 44.1 | 43.5 | 62.4 | 41.3 | 41.7 |
| Aged in hot air (after 168 hr at 100° C.) | | | | | |
| Hardness (Shore A) | 81 | 85 | 82 | 88 | 88 |
| Tensile strength (MPa) | 16.8 | 22.8 | 20.4 | 22.1 | 20.5 |
| Elongation at break (%) | 170 | 60 | 30 | 70 | 80 |

EXAMPLE 3

Six flux blend masterbatches were prepared according to the procedure of Example 1 and using the ingredients shown in Table 8. Masterbatches 1, 2 and 3 are polymer blends for use in the present invention while masterbatches 4, 5 and 6 are comparative.

Each of the masterbatches was compounded and press cured as in Example 2. Physical properties were determined as in Example 1 and the data are given in Table 9.

TABLE 8

| Masterbatch Identification: | 1 | 2 | 3 | 4 | 5 | 6 |
|---|---|---|---|---|---|---|
| Ingredients (parts by weight): | | | | | | |
| XNBR - II | 70 | 70 | 30 | 30 | 70 | 70 |
| PVC | 25 | 5 | 65 | 5 | — | — |
| Nylon - I | 5 | 25 | 5 | 65 | 30 | — |
| Nylon - II | — | — | — | — | — | 30 |
| Tris(nonylated phenyl) phosphite | 0.6 | 0.6 | 0.6 | 0.6 | 0.6 | 0.7 |
| Thiodiethylene bis(3,5-di-t-butyl-4-hydroxy)hydrocinnamate | 0.25 | 0.25 | 0.25 | 0.25 | 0.25 | 0.25 |
| Barium/cadmium stabilizer | 2.5 | 2.5 | 2.5 | 2.5 | 2.5 | 2.5 |
| Plasticizer (STRUKTOL 60 NS) | 3.5 | 3.5 | 3.5 | 3.5 | 3.5 | 3.5 |
| Mooney Viscosity (ML 1 + 4 at 100° C.): | 68 | 92 | * | * | 90 | 77 |

*Means not measured.

TABLE 9

| Masterbatch Identification: | 1 | 2 | 3 | 4 | 5 | 6 |
|---|---|---|---|---|---|---|
| Physical Properties Before Curing: | | | | | | |
| Mooney viscosity (ML 1 + 4 at 100° C.) | 38 | 45 | 44 | 25 | 50 | 46 |
| Mooney scorch (T₅ at 125° C.) (min) | 8.75 | 16.25 | 21.75 | 11.25 | 13.25 | 13.75 |
| Physical Properties After Curing: | | | | | | |
| Hardness (Shore A) | 70 | 78 | 85 | 68 | 82 | 80 |
| 100% Modulus (MPa) | 8.3 | — | 5.6 | — | — | 11.8 |
| Tensile Strength (MPa) | 13.7 | 5.9 | 5.9 | 3.3 | 13.3 | 12.7 |
| Elongation at break (%) | 310 | 90 | 140 | 90 | 70 | 110 |
| Tear strength, Die C (kN/m) | 33.3 | 24.5 | 50.0 | 14.7 | 22.5 | 23.5 |
| Compression set (% after 22 hr at 70° C.) | 38.2 | 36.0 | 59.6 | 37.2 | 35.4 | 31.7 |
| Aged in hot air (after 168 hr at 100° C.) | | | | | | |
| Hardness (Shore A) | 75 | 82 | 91 | 64 | 85 | 84 |
| Tensile strength (MPa) | 13.5 | 17.8 | 17.9 | 3.1 | 20.5 | 14.5 |
| Elongation at break (%) | 220 | 80 | 40 | 50 | 80 | 100 |

What is claimed is:

1. A vulcanizable polymer composition comprising a polymer blend and a curative system, said polymer blend being a flux blend of (i) from about 5 to about 50 parts by weight of polyvinyl chloride, (ii) from about 35 to about 75 parts by weight of a carboxylated nitrile rubber, (iii) from about 5 to about 50 parts by weight of a nylon having a melting point of less than about 210° C., the total of (i), (ii) and (iii) being 100 parts by weight, (iv) from about 1.5 to about 4 parts by total weight of one or more stabilizers for (i), and (v) from about 0.25 to about 3 parts by total weight of one or more antioxidants for (ii), said parts of (iv) and (v) being per 100 parts total of (i), (ii) and (iii).

2. The composition according to claim 1 wherein (ii) is a copolymer of butadiene, acrylonitrile and one or more α,β-unsaturated carboxylic acids selected from acrylic, methacrylic, fumaric, maleic and itaconic acids, and (iii) is selected from nylon-11 and nylon-12.

3. The composition according to claim 2 wherein the acrylonitrile content of (ii) is from about 25 to about 35 percent by weight and the carboxylic acid content of (ii) is from about 4 to about 8 percent by weight based on said copolymer, the amount of (i) is from about 5 to about 35 parts by weight and the amount of (iii) is from about 15 to about 35 parts by weight.

4. The composition according to claim 2 wherein the acrylonitrile content of (ii) is from about 25 to about 35 percent by weight and the carboxylic acid content of (ii) is from about 0.5 to about 2 percent by weight based on the copolymer, the amount of (i) is from about 20 to about 35 parts by weight, the amount of (ii) is from about 35 to about 50 parts by weight, and the amount of (iii) is from about 20 to about 35 parts by weight.

5. The composition according to claim 2 wherein (iv) is from about 2 to about 3 parts by weight of a mixed metal salt of barium/cadmium and (v) is a mixture of from about 0.4 to about 1 part by weight of tris(-nonylated phenyl) phosphite and from about 0.5 to about 1 part by weight of thiodiethylene bis(3,5-di-t-butyl-4-hydroxy)hydrocinnamate.

6. The vulcanizate obtained by heating the composition according to claim 2.

7. The vulcanizate obtained by heating the composition according to claim 3.

8. The vulcanizate obtained by heating the composition according to claim 4.

9. A process for preparing a vulcanizable polymer composition comprising admixing (i) from about 5 to about 50 parts by weight of polyvinyl chloride, (ii) from about 35 to about 75 parts by weight of a carboxylated nitrile rubber, (iii) from about 5 to about 50 parts by weight of a nylon having a melting point of less than about 210° C., the total of (i), (ii) and (iii) being 100 parts by weight, (iv) from about 1.5 to about 4 parts by total weight of one or more stabilizers for (i), and (v) from about 0.25 to about 3 parts by total weight of one or more antioxidants for (ii), said parts of (iv) and (v) being per 100 parts total of (i), (ii) and (iii), said admixing being at a temperature sufficient to cause fluxing of (i) and (iii) and mixing of all the components and for a length of time sufficient to cause such mixing but not to cause significant thermal degradation of the components, recovering and cooling the polymer blend so formed, and admixing said polymer blend with a curative system to form said polymer composition.

10. The process according to claim 9 wherein (ii) is a copolymer of butadiene, acrylonitrile and one or more α,β-unsaturated carboxylic acids selected from acrylic, methacrylic, fumaric, maleic and itaconic acids, and (iii) is selected from nylon-11 and nylon-12.

11. The process according to claim 10 wherein the acrylonitrile content of (ii) is from about 25 to about 35 percent by weight and the carboxylic acid content of (ii) is from about 4 to about 8 percent by weight based on said copolymer, the amount of (i) is from about 5 to about 35 parts by weight and the amount of (iii) is from about 15 to about 35 parts by weight.

12. The process according to claim 10 wherein the acrylonitrile content of (ii) is from about 25 to about 35 percent by weight and the carboxylic acid content of (ii) is from about 0.5 to about 2 percent by weight based on the copolymer, the amount of (i) is from about 20 to about 35 parts by weight, the amount of (ii) is from about 35 to about 50 parts by weight, and the amount of (iii) is from about 20 to about 35 parts by weight.

13. The process according to claim 10 wherein (iv) is from about 2 to about 3 parts by weight of a mixed metal salt of barium/cadmium and (v) is a mixture of from about 0.4 to about 1 part by weight of tris(nonylated phenyl) phosphite and from about 0.5 to about 1 part by weight of thiodiethylene bis(3,5-di-t-butyl-4-hydroxy)hydrocinnamate.

14. The process according to claim 10 wherein said curative system comprises an organic peroxide.

15. The process according to claim 14 wherein said curative system additionally comprises one or more sulfur-containing accelerators.

16. The process according to claim 10 wherein said curative system comprises elemental sulfur and one or more sulfur-containing accelerators.

17. The process according to claim 16 wherein said curative system additionally comprises a masterbatch of about equal parts by weight of zinc peroxide and a butadiene-acrylonitrile rubber.

18. The process according to claim 10 which further comprises heating said polymer composition to provide a vulcanizate.

19. The process according to claim 11 which further comprises heating said polymer composition to provide a vulcanizate.

20. The process according to claim 12 which further comprises heating said polymer composition to provide a vulcanizate.

21. The process according to claim 17 which further comprises heating said polymer composition to provide a vulcanizate.

* * * * *

UNITED STATES PATENT AND TRADEMARK OFFICE
CERTIFICATE OF CORRECTION

PATENT NO. : 4,438,230

DATED : March 20, 1984

INVENTOR(S) : Herbert Franz SCHWARZ

It is certified that error appears in the above-identified patent and that said Letters Patent is hereby corrected as shown below:

Column 5, Table 1, line 40, "Rislan" should read --Rilsan--.
Column 7, Table 3, line 25, "2,2"-dibenzothiazyl" should read --2,2'-dibenzothiazyl--.
Column 7, Table 4, under the column of data for masterbatch 6, "20.20" should read --20.0--.

Signed and Sealed this

Twelfth Day of March 1985

[SEAL]

Attest:

DONALD J. QUIGG

Attesting Officer

Acting Commissioner of Patents and Trademarks